United States Patent
Beran et al.

(10) Patent No.: US 6,211,470 B1
(45) Date of Patent: Apr. 3, 2001

(54) HEIGHT MEASUREMENT APPARATUS FOR DETERMINING THE VOLUME/DENSITY OF WOOD CHIPS ON A CONVEYOR

(75) Inventors: Robert Lynn Beran; David D. Mulligan, both of Covington, VA (US); Lawrence Hoy James, Raleigh, NC (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 09/444,441

(22) Filed: Nov. 22, 1999

(51) Int. Cl.[7] .................... G01G 11/14; B65G 43/00; B65G 47/00; D21F 11/00; D21F 13/00
(52) U.S. Cl. .............. 177/16; 177/25.11; 177/25.13; 177/116; 177/119; 33/1 V; 198/502.2; 162/198; 73/149; 222/55; 222/71; 222/77
(58) Field of Search ................ 33/1 V, 121, 122, 33/123, 501.04, 501.02, 551, 552, 553, 554, 555, 556, 557, 558, 558.01, 559, 560, 561; 73/149; 222/71, 55, 56, 77; 141/83; 198/502.2; 162/198, 263, 252; 177/16, 25.11, 25.12, 25.13

(56) References Cited

U.S. PATENT DOCUMENTS

| | | | |
|---|---|---|---|
| 1,647,704 | * 11/1927 | Lea | 198/502.2 |
| 2,312,216 | * 2/1943 | Keeler | 198/502.2 |
| 2,792,923 | * 5/1957 | Fraubose et al. | 198/502.2 |
| 2,860,420 | * 11/1958 | Denman, Jr. et al. | 33/1 V |
| 2,925,197 | 2/1960 | Frebel | 162/198 |
| 2,985,277 | * 5/1961 | Prellwitz | 198/502.2 |
| 3,064,357 | * 11/1962 | Butters | 198/502.2 |
| 3,154,673 | * 10/1964 | Edwards, Jr. | 33/1 V |
| 3,186,596 | 6/1965 | Badgett | 222/55 |
| 3,748,473 | 7/1973 | Chen | 250/392 |
| 3,761,712 | 9/1973 | Listerman | 250/388 |
| 3,794,843 | 2/1974 | Chen | 250/359 |
| 3,816,241 | 6/1974 | Blume | 162/198 |
| 3,822,032 | 7/1974 | Vergobbi | 222/55 |
| 3,822,179 | 7/1974 | Chari et al. | 162/198 |
| 3,898,124 | 8/1975 | Olson | 162/238 |
| 4,065,030 | 12/1977 | Greten | 222/55 |
| 4,071,399 | 1/1978 | Prough | 162/16 |
| 4,239,590 | 12/1980 | Prough | 162/49 |
| 4,487,278 | * 12/1984 | Rosenthal | 177/25.11 |
| 4,506,541 | 3/1985 | Cunningham | 73/861.02 |
| 4,520,883 | * 6/1985 | Fukuda | 177/25.11 |
| 4,582,992 | 4/1986 | Atwell et al. | 250/359.1 |
| 4,793,512 | 12/1988 | Krauss | 222/1 |
| 5,024,352 | 6/1991 | Gmür et al. | 73/861.37 |
| 5,207,098 | 5/1993 | Koch et al. | 73/290 R |
| 5,266,159 | 11/1993 | Greenwood et al. | 162/17 |
| 5,303,579 | 4/1994 | Smith, Jr. | 73/73 |
| 5,327,770 | 7/1994 | Hindle | 73/1 J |
| 5,369,368 | 11/1994 | Kassen et al. | 324/632 |
| 5,435,189 | 7/1995 | Gmuer et al. | 222/1 |
| 5,775,532 | 7/1998 | Bullivant | 222/1 |
| 5,783,042 | * 7/1998 | Leeman et al. | 162/198 |
| 5,808,242 | 9/1998 | Satake et al. | 177/210 C |
| 5,834,707 | 11/1998 | Wirth | 177/16 |
| 5,847,285 | 12/1998 | Box | 73/861 |
| 5,909,013 | * 6/1999 | Dlugos | 33/1 V |

\* cited by examiner

Primary Examiner—Randy W. Gibson
(74) Attorney, Agent, or Firm—J. R. McDaniel; R. L. Schmalz

(57) ABSTRACT

This invention relates to a height measurement apparatus for determining volume/density of wood chips on a conveyor. Such structures of this type, generally, employ the use of contacts that ride on top of the pile of wood chips in order to more accurately measure the volume and density of the wood chips.

7 Claims, 4 Drawing Sheets

HEIGHT MEASUREMENT APPARATUS FOR DETERMINING THE VOLUME/DENSITY OF WOOD CHIPS ON A CONVEYOR

BACKGROUND OF THE INVENTION

1. Field of the Invention

This invention relates to a height measurement apparatus for determining volume/density of wood chips on a conveyor. Such structures of this type, generally, employ the use of contacts that ride on top of the pile of wood chips in order to more accurately measure the volume and density of the wood chips.

2. Description of the Related Art

A conventional paper mill approach to measuring chip moisture relies on accurate, but slow, oven-drying of random belt grab samples of chips. Typically, chip moistures are measured several times throughout a day. This daily data becomes a part of monthly moisture averages that guides the paper mill digesting process. Consequently, this approach creates varying minimums and maximums throughout the year. Also, different wood species, different historical moisture and different sizes of chips available from chippers will alter the volume or density of a given chip pile. It is important to be able to accurately assess the chip moisture going into the digester, whether it a continuous or batch digester, of a paper mill because this affects the amount of chemicals that go into the digester and the operating conditions of the digester.

It is known to employ devices to correct flows of various items for moisture. Exemplary of such prior art is U.S. Pat. No. 3,186,596 ('596) to C. O. Badgett, entitled "Concrete Batch Blending Control System". While the '596 reference teaches how to correct a flow for moisture, it is not concerned with chip moisture for digesting. Also, it must be pointed out a similar negative result occurs for cement when moisture is unknown, namely the resulting product (concrete) quality can be poor. Finally, the '596 reference does not consider any impact of volume when measuring moisture.

It is also known to employ various devices for feeding wood chips into a digester. Exemplary of such prior art is U.S. Pat. No. 5,266,159 ('159) to B. Greenwood et al., entitled "Mass Flow Measurement, Preferably for Controlling Chip Feed to a Digester." While the '159 reference involves feeding a continuous digester with chips from a conveyor belt and controlling chip density, it recommends determining chip density in a free-fall of the chips. However, the '159 reference does not teach that volume of chips is important for density nor does it present a chip volume-determining method.

Several other references mention that both density and volume can be important when filling a container. Exemplary of such prior art are U.S. Pat. No. 4,582,992 ('992) to T. L. Atwell et al., entitled "Self-Contained, On-Line, Real-Time Bulk Material Analyzer," U.S. Pat. No. 3,822,032 ('032) to R. W. Vergobbi, entitled "Apparatus For Filling Containers Including Means Responsive to Both the Weight and the Height of the Material Dispensed," and U.S. Pat. No. 4,520,883 ('883) to M. Fukuda, entitled "Combinatorial Weighing Method and Apparatus With Volume." While these references mention both volume and density, the '292 reference uses gamma and neutron detectors to determine the "elemental content" of a bulk material in a chute based on the prompt gamma ray neutron activation analysis method. Similarly, the '032 reference employs a hopper that holds a preset allowable weight limit and a filling volume or height for a container. Finally, the '833 reference uses a consumer-product filling machine having a preset allowable weight limit and a filling volume or height for a container.

It is also known to employ a nuclear source for use in chip moisture measurement. Moisture is measured by such neutron devices by determining the hydrogen content of both the wood chip material and the conveyor belt, subtracting the hydrogen content of the belt and surroundings, and distinguishing between higher hydrogen contents due to more chip moisture or more chips in the pile. Exemplary of such prior art are U.S. Pat. No. 3,748,473 ('473) to Y. M. Chen, entitled "Gauge for Determining the Percentage by Weight of Moisture Contained in a Bulk Material Transported on a Moving Conveyor," U.S. Pat. No. 3,761,712 ('712) to P. L. Listerman, entitled "Gauge for Determining the Percentage by Weight of Moisture Contained in a Bulk Material Transported on a Moving Conveyor," and U.S. Pat. No. 3,794,843 ('843) to Y. M. Chen, entitled "Gauge for Determining the Percentage by Weight of Moisture Contained in a Bulk Material Transported on a Moving Conveyor." While the '473, '712, and '843 references employ a nuclear source for chip moisture measurement, the percent moisture is determined as the ratio of weight of water over total water. The weight of water is estimated by sensing slowed neutrons. The total weight is similarly determined by sensing the result of impacts of an object by gamma rays. The specifics of signal collection during the set of testing intervals is defined in the '712 reference. The special case of determining percent moisture for very high moisture levels and/or high levels of iron or sodium chloride is set forth in the '843 reference. However, none of these references consider correcting the radiation measurements for the volume of material being measured. Also, none of these references measure the volume or height.

It is also known to employ a chip moisture meter to measure chip volume on a conveyor. See, for example, FIG. 1. As shown in FIG. 1, the wood chips are transported down a conveyor. As the chips are transported down the conveyor, they are rearranged on the belt so as to have a Gaussian distribution cross-section of bulk material including a maximum height. An ultrasonic beam is used in the height sensor. While this device can accurately measure the height of the pile, it cannot accurately measure the density of the pile because the volume it estimates is not necessarily accurate. Also, this prior art device requires frequent re-calibration since chip distribution can vary with height.

It is apparent from the above that there exists a need in the art for an accurate height measurement system which is capable of measuring the volume and density of wood chips on a conveyor. It is a purpose of this invention to fulfill this and other needs in the art in a manner more apparent to the skilled artisan once given the following disclosure.

SUMMARY OF THE INVENTION

Generally speaking, this invention fulfills these needs by providing a height measurement apparatus for determining the volume/density of a pile of wood chips on a conveyor, comprising a plurality of wood chip pile contact means in contact at one end to the wood chip pile, an arm means rigidly attached at the other end of each of the contact means, an angle measurement means located a predetermined distance away from the arm means for measuring an angle of movement of each of the arm means, a bracket means operatively connected to the arm means and the angle measurement means and extending substantially across a cross-section of the wood chip pile, and a wood chip pile weight measuring means operatively connected to the wood chip pile conveyor and the angle measurement means.

In certain preferred embodiments, the angle measurement means includes a potentiometer. Also, the wood chip pile contact means are constructed of spring steel. Finally, an inertial dampener is attached to the other end of the arm to act as a counter-balance while the wood chip contact means contact the changing wood chip pile surface.

In another further preferred embodiment, the volume/density of a wood chip pile can be accurately determined even if the wood chip pile is not uniformly constructed, i.e., in a Gaussian distribution.

The preferred measurement device, according to this invention, offers the following advantages: ease of assembly and repair; good stability; good durability; excellent economy; excellent height measurement; excellent volume measurement; and excellent density measurement. In fact, in many of the preferred embodiments, these factors of economy, height measurement, volume, and density measurement are optimized to the extent that is considerably higher than heretofore achieved in prior, known measurement devices.

The above and other features of the present invention, which will become more apparent as the description proceeds, are best understood by considering the following detailed description in conjunction with the accompanying drawings, wherein like characters represent like parts throughout the several views and in which:

A BRIEF DESCRIPTION OF THE DRAWINGS

DETAILED DESCRIPTION OF THE INVENTION

Figure 1:
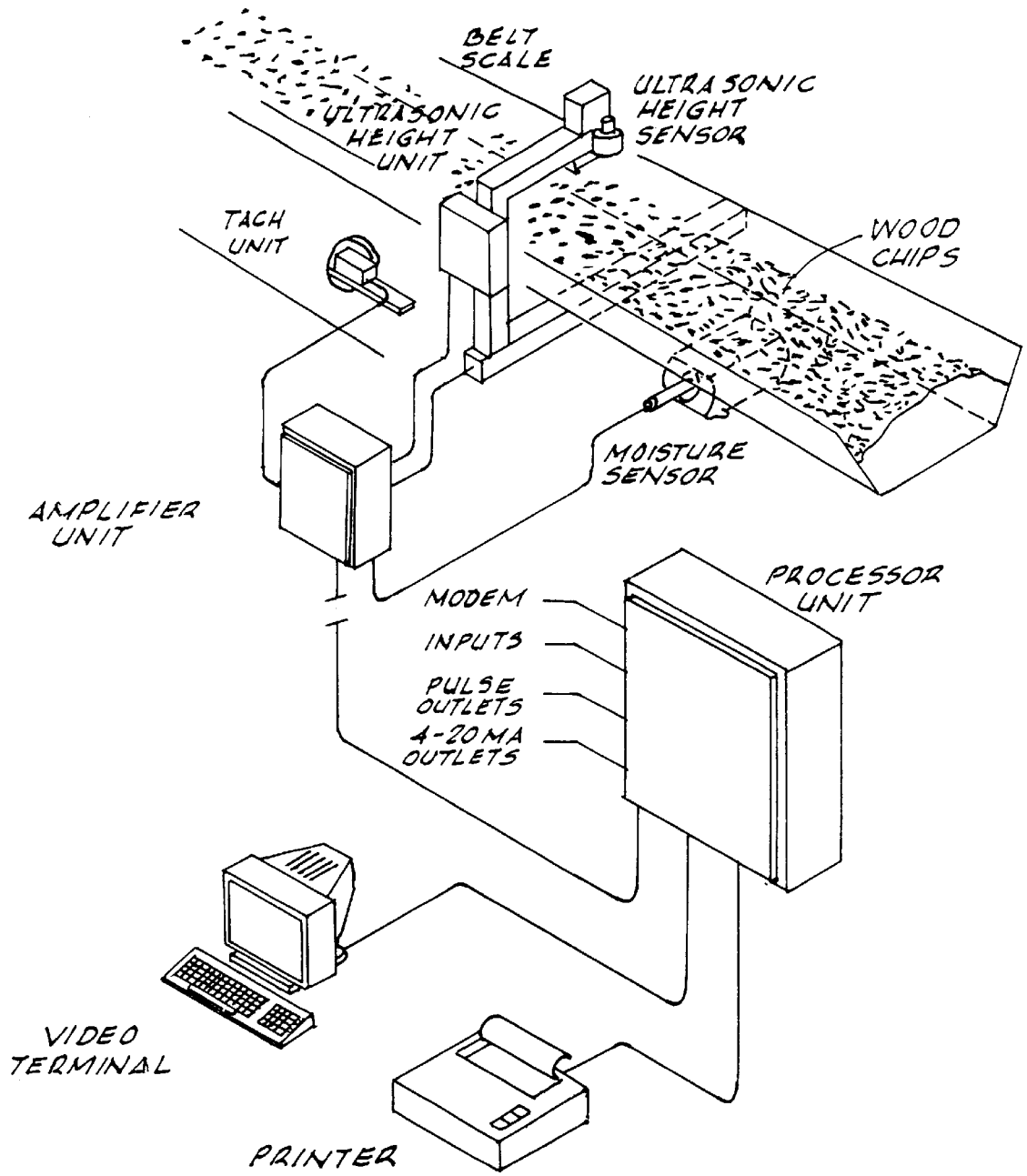
FIG. 1 is a schematic illustration of a chip moisture measurement system, according to the prior art.

As discussed earlier, FIG. 1 is a schematic illustration of a chip moisture measurement device, according to the prior art. This device is manufactured by Acrowood of Everett, Wash.

Figure 2:
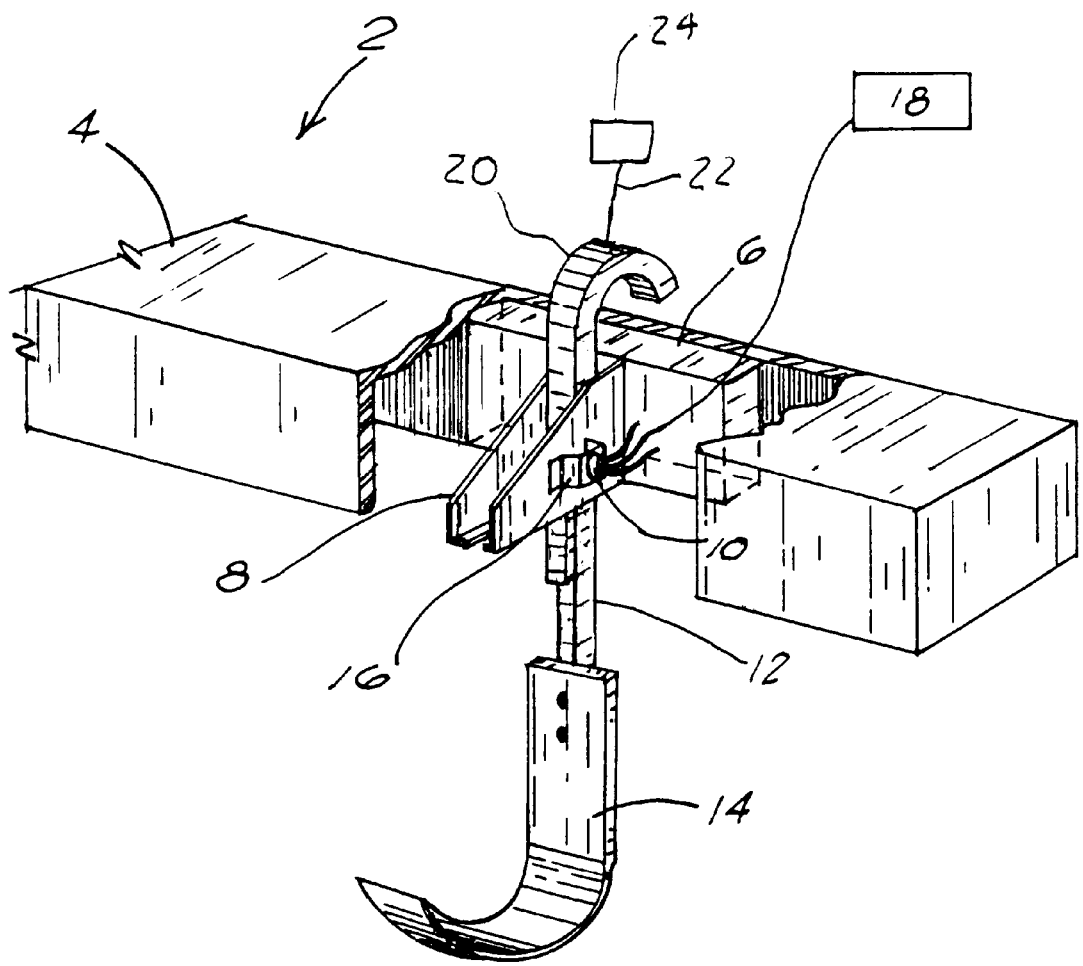
FIG. 2 is an isometric view of a height measurement system for volume/density determination of wood chips on a conveyor, according to the present invention.

With reference to FIG. 2, there is illustrated an advantageous environment for use of the concepts of this invention. In particular, height measurement apparatus 2 for the determination of volume/density of wood chips on a conveyor 100 (FIG. 4) is illustrated. In particular, apparatus 2 includes, in part, conventional brackets 4 and 6, brackets 8, conventional pivot pin 10, arm 12, pile contact 14, movement sensor 16, control mechanism 18, and inertial dampener 20.

Preferably, brackets 4, 6, and 8 are constructed of any suitable, durable ferro-magnetic material because such ferro-magnetic materials are readily distinguishably from wood chips by a conventional magnetic scavenger. Pivot pin 10, preferably, is constructed of any suitable, durable ferro-magnetic material and is placed within bracket 8 to allow arm 12 to freely pivot. Arm 12, preferably, is constructed of any suitable, durable ferro-magnetic material. Contact 14, preferably, is constructed of spring steel. Sensor 16, preferably, is a potentiometer which is capable of measuring the angle of movement of arm 12. Inertial dampener 20 is rigidly attached to the other end of arm 12 in order to keep contact 14 against the changing pile of wood chips moving along the conveyor (FIGS. 3 and 4) at the point of measurement.

Finally, a conventional control system 18 is electrically connected to sensor 16. The angle of movement of arm 12 is read by sensor 16 and this information is fed back to control mechanism 18. This information is then conventionally manipulated in control mechanism 18 to provide the operator with information regarding the height of the moving wood pile, the volume of the wood pile, and the density of the wood pile, which will be discussed later.

Figure 3:
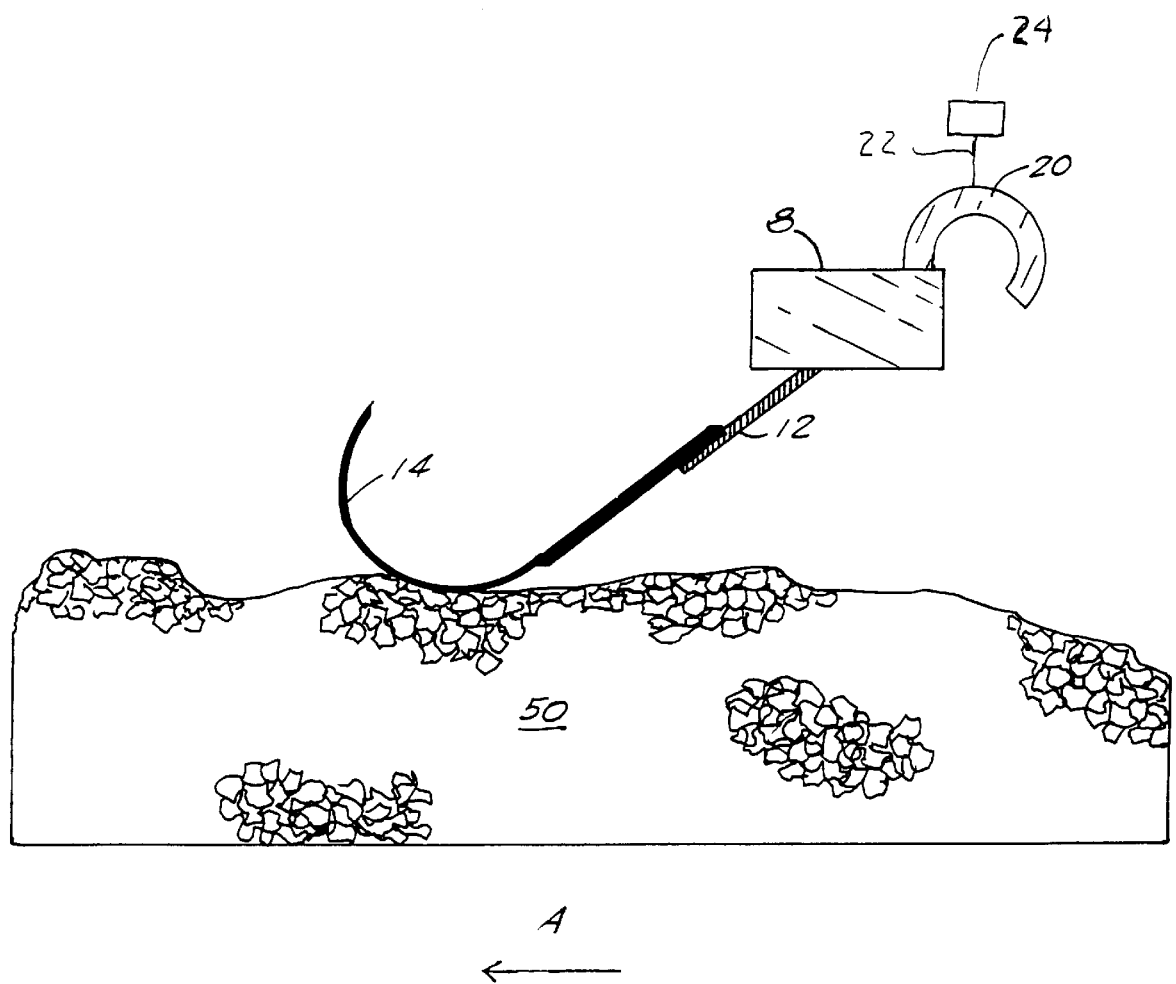
FIG. 3 is a side view of the height measurement system for volume/density determination of wood chips on a conveyor.

As shown in FIG. 3, contact 14 is able to ride along the top of pile 50 of wood chips. Wood chips are moving along the direction of arrow A. The inertial dampener 20 counteracts the rapid, bouncing movement of contacts 14 up and down so as to keep contacts 14 substantially in contact with the top of wood pile 50. Dampener 20 must be constructed so as to retain its center of gravity substantially over pivot pin 10. Dampener 20 includes, in part, extension 22 and weight 24. Preferably, dampener 20, extension 22 and weight 24 are constructed of any suitable, durable ferromagnetic material. Extension 22 is rigidly connected to dampener 20 by conventional techniques. Weight 24 is rigidly connected to extension 22 by conventional techniques.

Figure 4:
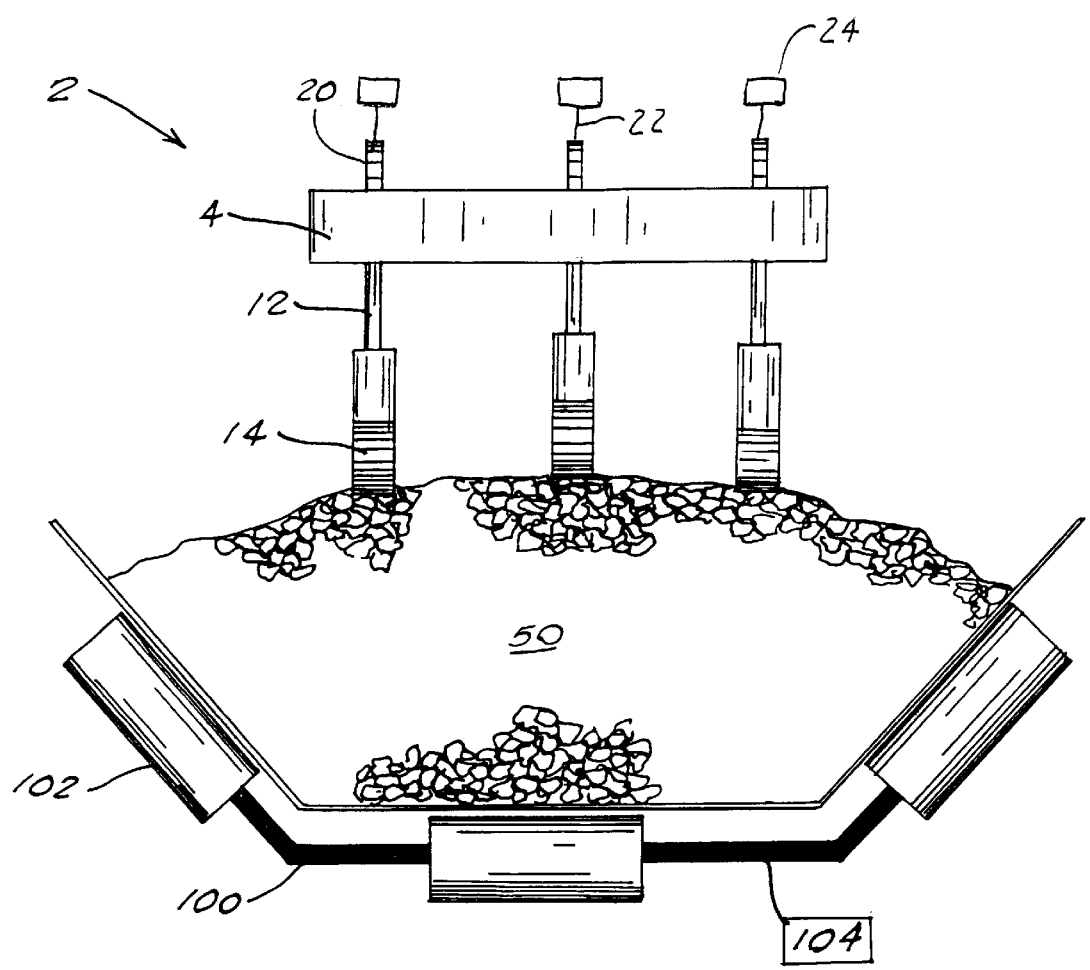
FIG. 4 is a front view of the height measurement device for volume/density determination of wood chips on a conveyor.

As shown in FIG. 4, a conventional conveyor 100 includes rollers 102 and a weight measurement device 104 which is located beneath wood chip pile 50. Also, inertial dampener 20 can be seen in FIG. 4. A plurality of height measurement apparatus 2 are located along the cross-section of wood chip pile 50 in order to provide an accurate determination of the volume of wood chip pile 50. In this manner, any deviation across the cross-section of wood chip pile 50 will be accounted for by the plurality of height measurement apparatus 2.

In order to determine the density of wood chip pile 50 having a non-gaussian distribution, knowledge of the cross sectional area leads to an accurate estimate of the volume flow, Q.

$$Q=Av, \tag{Eq. 1}$$

Where A is the cross sectional area being determined and v is the speed of the belt, which are readily known.

Since the weight flow, W is already measured by weight measurement device 104, the density ($\rho$) of the wood chips may be determined, according to Equation 2:

$$\rho=W/Q \tag{Eq. 2}$$

After the density has been determined, a conventional moisture measuring device, such as the one previously discussed with respect to the nuclear source used with chip moisture measurement, can be provided with the accurate determination of the volume/density of the wood chips in order to more accurately determine the moisture of those wood chips. Ideally, this would then result in a more efficient use of the chemicals added into the digester and a more efficient use of the digester.

As further proof of the efficacy of the present invention, the following Example is presented.

EXAMPLE

The apparent moisture value of chips by the neutron meter is composed of several factors:

(1) The actual moisture level in chips, indicated by the H-atoms of water;
(2) The base level for an empty conveyor belt with no chips on the belt; and
(3) The volume/density of the chip pile on the traveling belt.

The first correction, for base level, overcomes changes in positioning of contacts 14, conveyor belt area differences, changes in belt speed between times of measurement, etc.

The second correction, for volume/density, is also critical. The chip moisture meter cannot distinguish from the neutron reading whether the neutron reading is higher because chips are more moist, piled higher, or there are denser chips in the same volume. All these increase neutron measurement value, and hence the "apparent" moisture.

The most difficult job is measuring the volume on the fast belt. In the present invention this is done by averaging the cross-sectional height from three point measurements by apparatus 2 of chip pile 50 height on the belt 100. However, the top of the chip pile 50 on a belt 100 may develop undulations from chips being added and then slipping back down an upward-traveling belt 100. Therefore, an inertial counterweight dampener 20 is added to overcome the "bounce" of volume-measuring contacts 14 when they pass over undulation bumps. Without this correction, contacts 14 alone will give an inflated estimate of chip volume due to contacts bounce, and an overcorrection of moisture value for chips will be made using chip volume.

The data below compare measurements by: (1) undampenered "contacts only" pile meter for 15 digester batches= "o" vs. (2) dampened pile meter for 15 other digester batches="d".

The table shows that the addition of an inertial dampener to contacts 14, which hold contacts 14 to the pile surface despite constant undulations, reduced apparent net pile height by over 5%.

TABLE

| Equipment Used to Measure Chip Volume | Ave. Flow Rate of Chips on Conveyor | Apparent Average Pile Height = A | Base Height when Belt is Empty = B | True Chip Pile Height (C = A − B) | % correction by dampener, (Co−Cd)/ Co × 100% |
|---|---|---|---|---|---|
| Pile meter with contacts only (o) | 526.7 (range 483–563) | 8.69 (range 8.32– 9.02) | 6.26 (range 6.23– 6.28) | 2.43 | control |
| Pile meter-- contacts plus dampeners (d) | 510.9 (range 468–533) | 8.84 (range 8.40– 9.05) | 6.56 (range 6.46– 6.68) | 2.28 | 6.2% |

Once given the above disclosure, many other features, modifications or improvements such as volume measurement of other materials than wood chips will become apparent to the skilled artisan. Such features, modifications or improvements are, therefore, considered to be a part of this invention, the scope of which is to be determined by the following claims.

What is claimed is:

1. A height measurement apparatus for determining said volume/density of a pile of wood chips on a conveyor, wherein said apparatus is comprised of:

a plurality of wood chip pile contact means in contact at one end to said wood chip pile;

an arm means rigidly attached at said other end of each of said contact means;

an angle-measurement means located a predetermined distance away from said arm means for measuring an angle of movement of each of said arm means;

a bracket means operatively connected to said arm means and said angle-measurement means and extending substantially across a cross-section of said wood chip pile; and a wood chip pile weight-measuring means operatively connected to said wood chip pile conveyor and said angle-measurement means.

2. The apparatus, as in claim 1, wherein said angle-measurement means is further comprised of:

a potentiometer; and a density calculating means operatively connected to said potentiometer.

3. The apparatus, as in claim 1, wherein said contact means are constructed of:

spring steel.

4. The apparatus, as in claim 1, wherein said apparatus is further comprised of:

an inertial dampener means operatively connected to said arm means.

5. The apparatus, as in claim 4, wherein said inertial dampener is further comprised of:

a flexible extension operatively connected to said inertial dampener; and a weight means operatively connected to said extension.

6. A method for determining a volume/density of a pile of wood chips, comprising a plurality of wood chip pile contact means, an arm means, an angle-measurement means, and a wood chip pile weight-measuring means, wherein said method is comprised of said steps of:

conveying a pile of wood chips down a conveyor;

measuring a weight, W, of a cross-sectional portion of said wood chip pile by said wood chip pile weight-measuring means;

contacting said cross-sectional portion of said wood chip pile with said contact means;

measuring an angle of measurement of said arm means;

forwarding said measurement angle of movement to a density calculating means; and determining a density of said cross-sectional portion of said wood chip pile.

7. The method, as in claim 6, wherein said density determining step is further comprised of the steps of:

measuring a cross-sectional area, A, of said wood chip pile;

measuring a speed, v, of said conveyor;

determining a volume flow, Q, of said wood chip pile, according to the Equation:

$Q=Av;$ and determining said density, $\rho$, of said wood chip pile, according to the Equation:

$\rho W/Q.$

* * * * *